United States Patent
Franke et al.

(10) Patent No.: US 11,176,023 B2
(45) Date of Patent: Nov. 16, 2021

(54) PERFORMING SOFTWARE UPDATES USING ENVIRONMENT EMULATION

(71) Applicant: International Business Machines Corporation, Armonk, NY (US)

(72) Inventors: Jeffery Michael Franke, Apex, NC (US); Franck Excoffier, Katy, TX (US); Itzhack Goldberg, Hadera (IL); Ofir D. Cohen, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/551,560

(22) Filed: Aug. 26, 2019

(65) Prior Publication Data

US 2021/0064509 A1    Mar. 4, 2021

(51) Int. Cl.
  *G06F 11/36*    (2006.01)
  *G06F 8/65*    (2018.01)
(52) U.S. Cl.
  CPC ............ *G06F 11/368* (2013.01); *G06F 8/65* (2013.01); *G06F 11/3664* (2013.01)
(58) Field of Classification Search
  CPC ............ G06F 11/3672; G06F 11/368; G06F 11/3664; G06F 8/65
  See application file for complete search history.

(56) References Cited

U.S. PATENT DOCUMENTS

| | | | |
|---|---|---|---|
| 7,334,136 B2 | 2/2008 | Levy et al. | |
| 7,770,164 B2 | 8/2010 | Schuelein et al. | |
| 7,774,289 B2 * | 8/2010 | Aniszczyk | G06F 8/65 706/45 |
| 8,069,372 B2 | 11/2011 | Natvig | |
| 8,392,902 B2 | 3/2013 | Reinz | |
| 8,762,787 B2 | 6/2014 | Lam et al. | |
| 9,286,056 B2 | 3/2016 | Groover et al. | |
| 9,823,999 B2 * | 11/2017 | Younger | G06F 8/65 |
| 2005/0223362 A1 | 10/2005 | Whitlock et al. | |
| 2006/0090136 A1 | 4/2006 | Miller et al. | |
| 2008/0271025 A1 | 10/2008 | Gross et al. | |
| 2009/0106256 A1 * | 4/2009 | Safari | G06F 11/302 |
| 2017/0147320 A1 * | 5/2017 | Persson | G06F 8/65 |
| 2018/0113728 A1 * | 4/2018 | Musani | G06F 11/362 |

* cited by examiner

*Primary Examiner* — Duy Khuong T Nguyen
(74) *Attorney, Agent, or Firm* — Zilka-Kotab, P.C.

(57) ABSTRACT

A computer-implemented method, according to one embodiment, includes: receiving configuration information which corresponds to hardware and software configurations of a user computing environment. This configuration information is used to create a test computing environment which emulates the hardware and software configurations of the user computing environment. Moreover, a software update is applied to the test computing environment, and the test computing environment is operated with the software update applied thereto. Results which correspond to performance of the test computing environment during the operation are received, and a determination is made as to whether one or more errors were experienced by the test computing environment during the operation. In response to determining that at least one error was experienced by the test computing environment during the operation, implementation of the software update in the user computing environment is postponed.

17 Claims, 10 Drawing Sheets

PERFORMING SOFTWARE UPDATES USING ENVIRONMENT EMULATION

BACKGROUND

The present invention relates to software update testing, and more specifically, this invention relates to using hardware and software emulation to test software updates.

A software update is a download for an application, operating system, software suite, etc., that causes some change to the existing software. Over time, software updates are developed as a result of a number of different factors. For instance, some software updates are designed to achieve improvements in operational performance, while others are developed to address an unintended issue caused by the software. A common software update is a security update, which is issued to protect a computer against vulnerabilities that might arise.

Pre-checks are sometimes performed when updating a given software version in order to identify broken hardware and known software incompatibilities. The pre-check is thereby able to help ensure that the software update is implemented successfully. However, the process of actually applying the software update often fails even when the pre-check screening is performed and indicates that there are no identifiable issues. As a result, the software update ends up causing operational downtime which is particularly disruptive in non-redundant systems and may cause performance impacts on redundant systems. To make matters worse, remote software updates continue to become more prevalent, thereby increasing the importance of successful software updates in the absence of a system technician (e.g., an administrator) on sight.

SUMMARY

A computer-implemented method, according to one embodiment, includes: receiving configuration information which corresponds to hardware and software configurations of a user computing environment. This configuration information is used to create a test computing environment which emulates the hardware and software configurations of the user computing environment. Moreover, a software update is applied to the test computing environment, and the test computing environment is operated with the software update applied thereto. Results which correspond to performance of the test computing environment during the operation are received, and a determination is made as to whether one or more errors were experienced by the test computing environment during the operation. In response to determining that at least one error was experienced by the test computing environment during the operation, implementation of the software update in the user computing environment is postponed.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
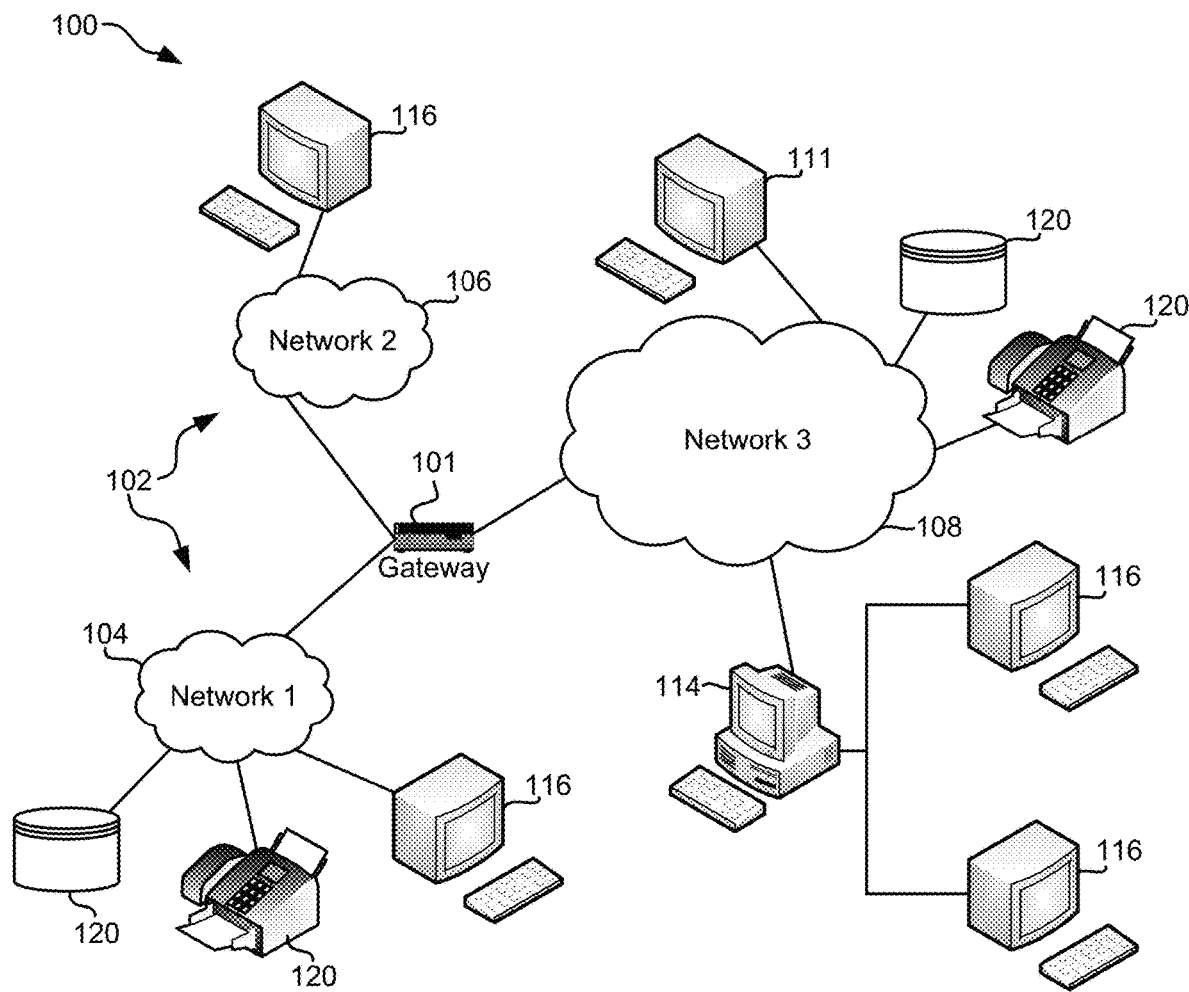
FIG. 1 is a representational view of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for applying planned software and/or hardware updates to a testing environment which emulates both the physical (e.g., hardware) and logical (e.g., software) configurations of the user computing environments that the updates are planned to be applied to. In doing so, the planned software and/or hardware updates can be tested in order to identify any issues that would arise as a result of actually implementing the updates in the user computing environment. Adjustments may thereby be made to the updates before implementation, e.g., as will be described in further detail below.

In one general embodiment, a computer-implemented method includes: receiving configuration information which corresponds to hardware and software configurations of a user computing environment. This configuration information is used to create a test computing environment which emulates the hardware and software configurations of the user computing environment. Moreover, a software update is applied to the test computing environment, and the test computing environment is operated with the software update applied thereto. Results which correspond to performance of the test computing environment during the operation are received, and a determination is made as to whether one or more errors were experienced by the test computing environment during the operation. In response to determining that at least one error was experienced by the test computing environment during the operation, implementation of the software update in the user computing environment is postponed.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, and/or Linux® in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
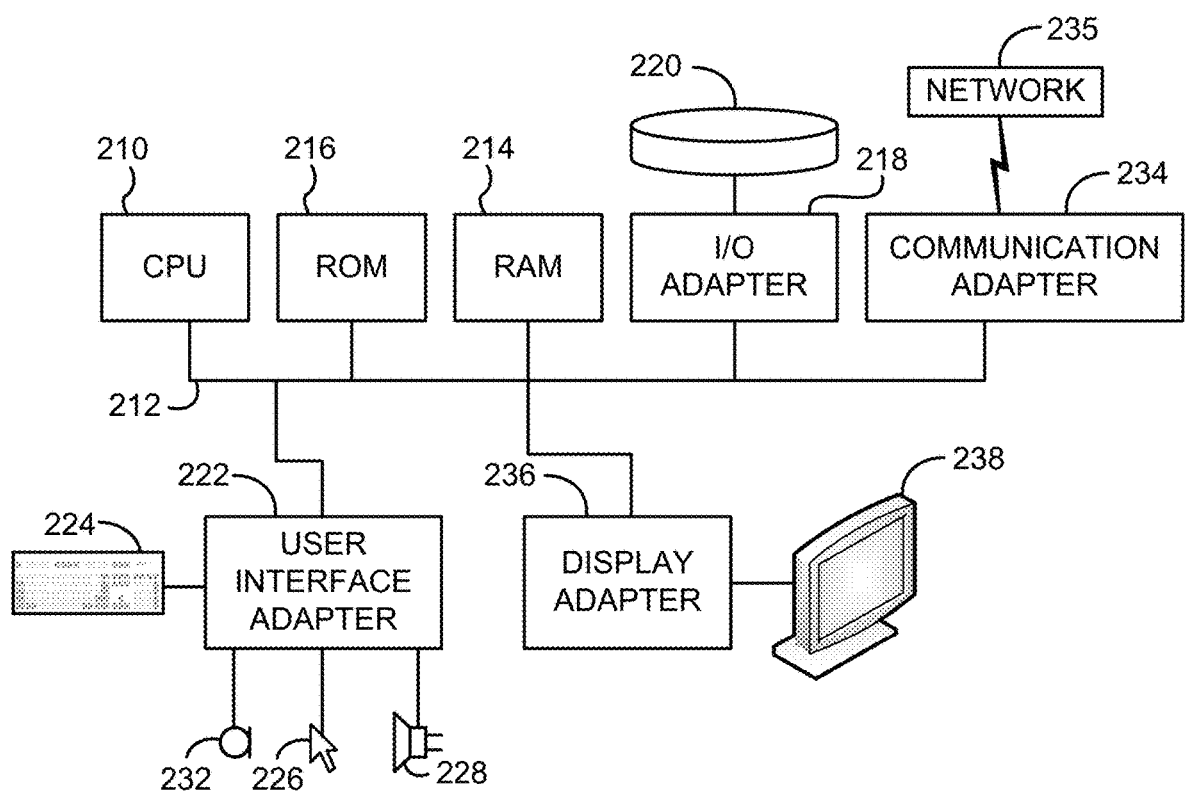
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
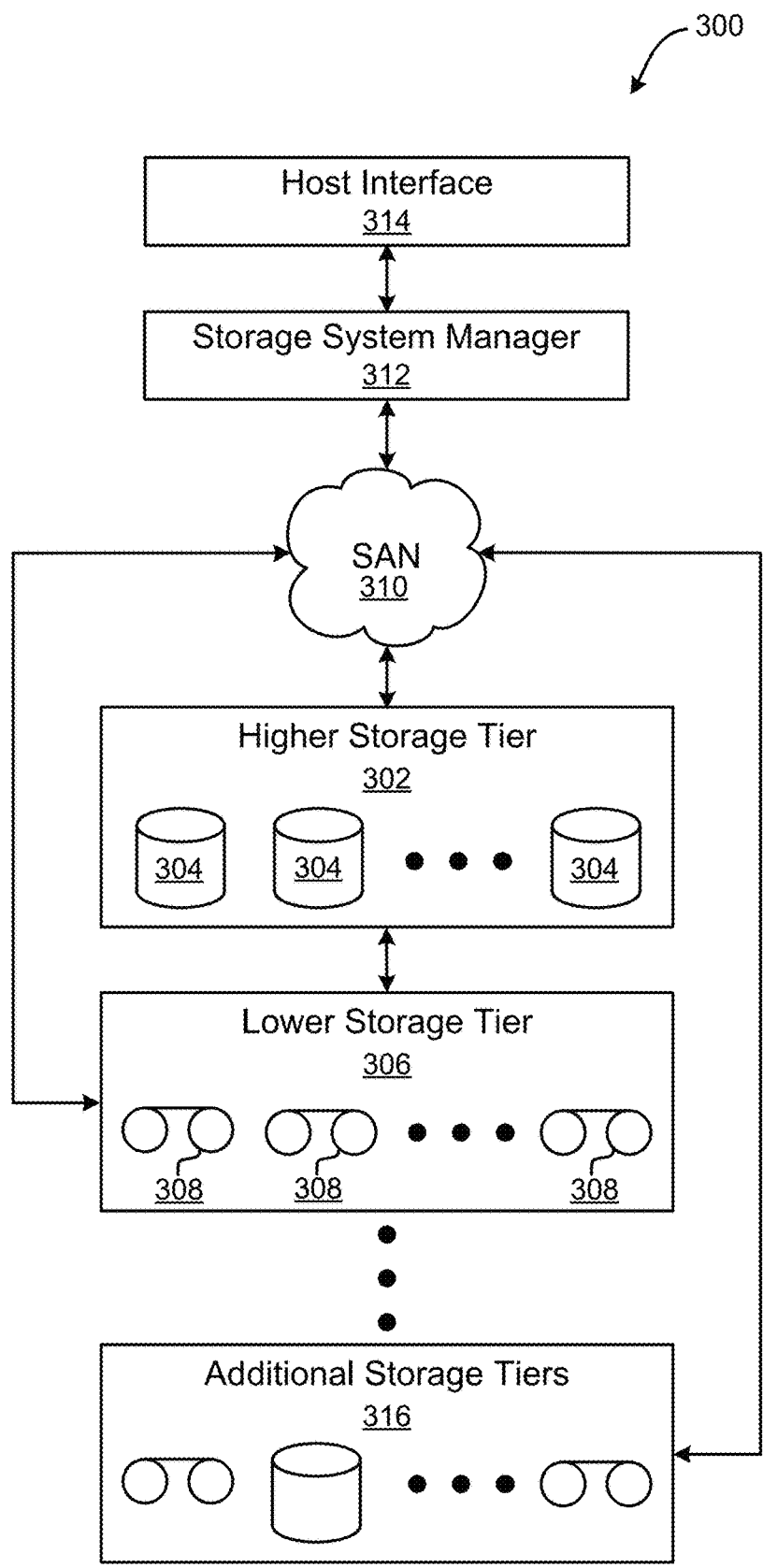
FIG. 3 is a representational view of a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one storage tier, the tiers can be a mix of higher storage tiers 302 and at least one lower storage tiers 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, software updates are developed and implemented over time as a result of a number of different factors. For instance, some software updates are designed to achieve improvements in operational performance, while others are developed to address an unintended issue caused by the software. Pre-checks are sometimes performed when updating a given software version in order to identify broken hardware and known software incompatibilities. The pre-check is thereby able to help ensure that the software update is implemented successfully.

However, the process of actually applying the software update often fails for conventional implementations, even when the pre-check screening is performed and indicates that there are no identifiable issues. As a result, the software update often ends up causing operational downtime which is particularly disruptive in non-redundant systems. To make matters worse, remote software updates continue to become more prevalent, thereby increasing the importance of achieving successful software updates in the absence of having a system technician (e.g., an administrator) on sight.

In sharp contrast to the aforementioned shortcomings experienced by conventional implementations, various ones of the embodiments included herein are able to implement software updates without causing any issues in the systems to which the updates are being applied. In some approaches, this is ensured as a result of applying each software update to a test computing environment which emulates the hardware and software configurations of the computing environment for which the update is intended, e.g., as will be described in further detail below.

Figure 4:
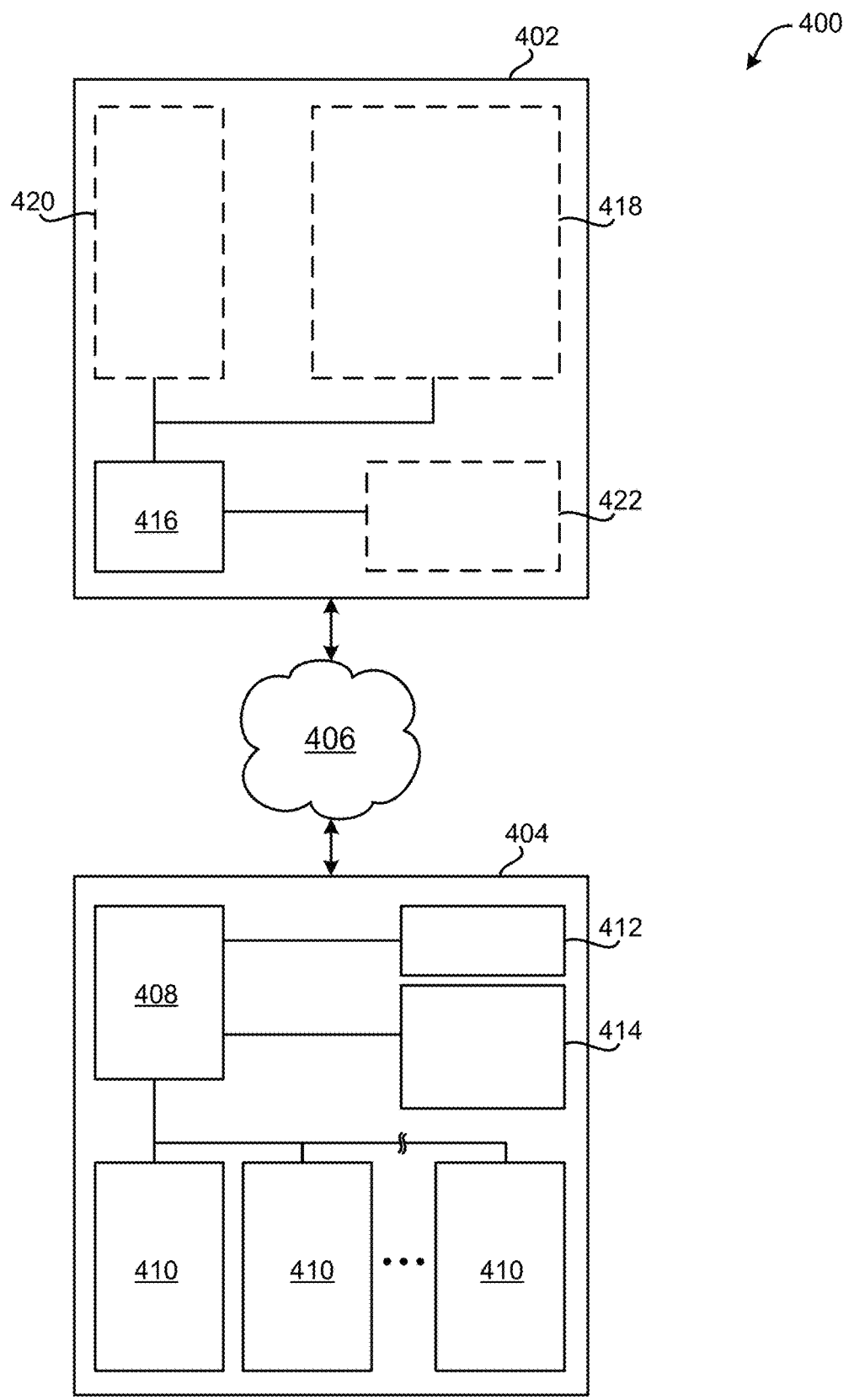
FIG. 4 is a partial representational view of a distributed computing system in accordance with one embodiment.

Looking to FIG. 4, a distributed computing system 400 which enables communication between a software provider 402 and a user computing environment 404, is depicted in accordance with one embodiment. As an option, the present distributed computing system 400 may be implemented in conjunction with features from any other embodiment listed herein, such as those described with reference to the other FIGS. However, such distributed computing system 400 and others presented herein may be used in various applications and/or in permutations which may or may not be specifically described in the illustrative embodiments listed herein. Further, the distributed computing system 400 presented herein may be used in any desired environment. Thus FIG. 4 (and the other FIGS.) may be deemed to include any possible permutation.

As shown, the software provider 402 and a user computing environment 404 are connected to each other over a network 406 which extends therebetween. It should be noted that the network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the software provider 402 and the user computing environment 404 (e.g., "product consumer") are able to communicate with each other regardless of the amount of separation which exists therebetween, e.g., despite being positioned at different geographical locations. Moreover, each of the software provider 402 and the user computing environment 404 may actually be coupled to the network 406 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

The user computing environment 404 is illustrated as including a central controller 408 which is coupled to a plurality of other hardware components. Specifically, the controller 408 is coupled to memory components 410, a network switch 412, and a cache 414. In some approaches the memory components 410 may form a data storage array, while in some approaches the network switch 412 may be a fiber channel switch. However, it should be noted that although certain types and numbers of hardware components are depicted in the user computing environment 404 of FIG. 4, these are in no way intended to be limiting. For example, more than one network switch may be coupled to the controller 408, each of which may be the same type or different types of network switches.

It follows that the user computing environment 404 may have any desired configuration of hardware components depending on the approach. Similarly, the configuration of the software that is implemented on each of the hardware components in the user computing environment 404, or by the user computing environment 404 as a whole may also vary depending on the given approach. For instance, a number of hosts that are connected to the user computing environment, a number or logical unit numbers (LUNs) included at the user computing environment, etc., may vary. These hardware and/or software configurations that are implemented at the user computing environment 404 may further have an effect on the performance capabilities of the computing environment. For example, the number of input/output operations per second (IOPs) that may be achieved by the user computing environment 404 depends on the hardware and/or software configurations thereof.

Looking now to the software provider 402, a controller 416 is coupled to a number of hardware component modules, each of which correspond to a different type of hardware components. In the present approach, the controller 416 is specifically coupled to a memory module 418, a network switch module 420, and a cache module 422. While each of these modules 418, 420, 422 correspond to a different type of hardware components, the physical configuration of the hardware components included in each of the modules themselves may be adjusted as desired. For example, hardware components may be added to, removed from, moved within, connected to each other differently, etc., depending on the given approach. Moreover, the software configurations implemented on the various hardware components in each of the modules 418, 420, 422 may also be adjusted depending on the particular approach. The specific hardware and software configurations that are implemented at the software provider environment 402 may thereby be customized as desired, e.g., as will soon become apparent.

As mentioned above, a software update is preferably tested prior to being released for implementation at one or more user locations. By testing the software update prior to actual implementation, any issues may be identified and remedied beforehand. While testing a software update on a default (e.g., generic) computing environment provides some insight as to how the software update may perform generally, the update may perform quite differently when implemented at a specific user computing environment having specific hardware and software configurations. Thus, by adjusting the hardware and software configurations that are implemented at the software provider environment 402 prior to applying a software update thereto, some of the embodiments included herein are able to accurately predict how a specific user computing environment will react to the software update (e.g., see method 500 below).

Referring still to FIG. 4, the software provider environment 402 receives various types of information from the user computing environment 404 over time. For example, "call-home" or other diagnostic data is received from the user computing environment 404 and collected (e.g., stored in memory) at the software provider environment 402 over time. Requests for specific types of information may also be sent to the user computing environment 404 by the software provider environment 402. The information that is received from the user computing environment 404 over time thereby provides a detailed view as to how the user computing environment 404 is configured and operates in a variety of different situations.

This data may further be used to configure the software provider environment 402 such that it emulates the hardware and software configurations of the user computing environment 404. An illustrative list of hardware and software configurations of the user computing environment that may be emulated in the test computing environment includes, but is in no way limited to, a number of IOPs performed by the user computing environment, a number of hosts that are connected to the user computing environment, a number of LUNs that are included at the user computing environment, types of network switches (e.g., fiber channel switches) that are connected to the user computing environment, a number of processors included in the user computing environment, the operating system software implemented in the user computing environment, etc. It should also be noted that for configuration settings that are unknown, the software provider environment 402 may simply apply default values that are predetermined by an administrator, based on industry standards, computed based on known configuration settings, etc. According to an example, configuration settings may include any of those that are configurable using methods which would be apparent to one skilled in the art after reading the present description, e.g., such as using a command-line interface (CLI), a graphical user interface (GUI), a simple network management protocol (SNMP), scripts and/or patches applied to the system, etc.

By applying a planned software update to the same hardware and/or software configuration as that of a user computing environment allows access to additional failure conditions which enable detailed assessment of steps that are available to remedy any issues experienced by the update, e.g., such as configuration changes, training, identification of previously unknown software bugs, etc. This may also lead to additional processes being introduced to health check procedures used prior to implementing a software update, e.g., as will be described in further detail below.

Figure 5A:
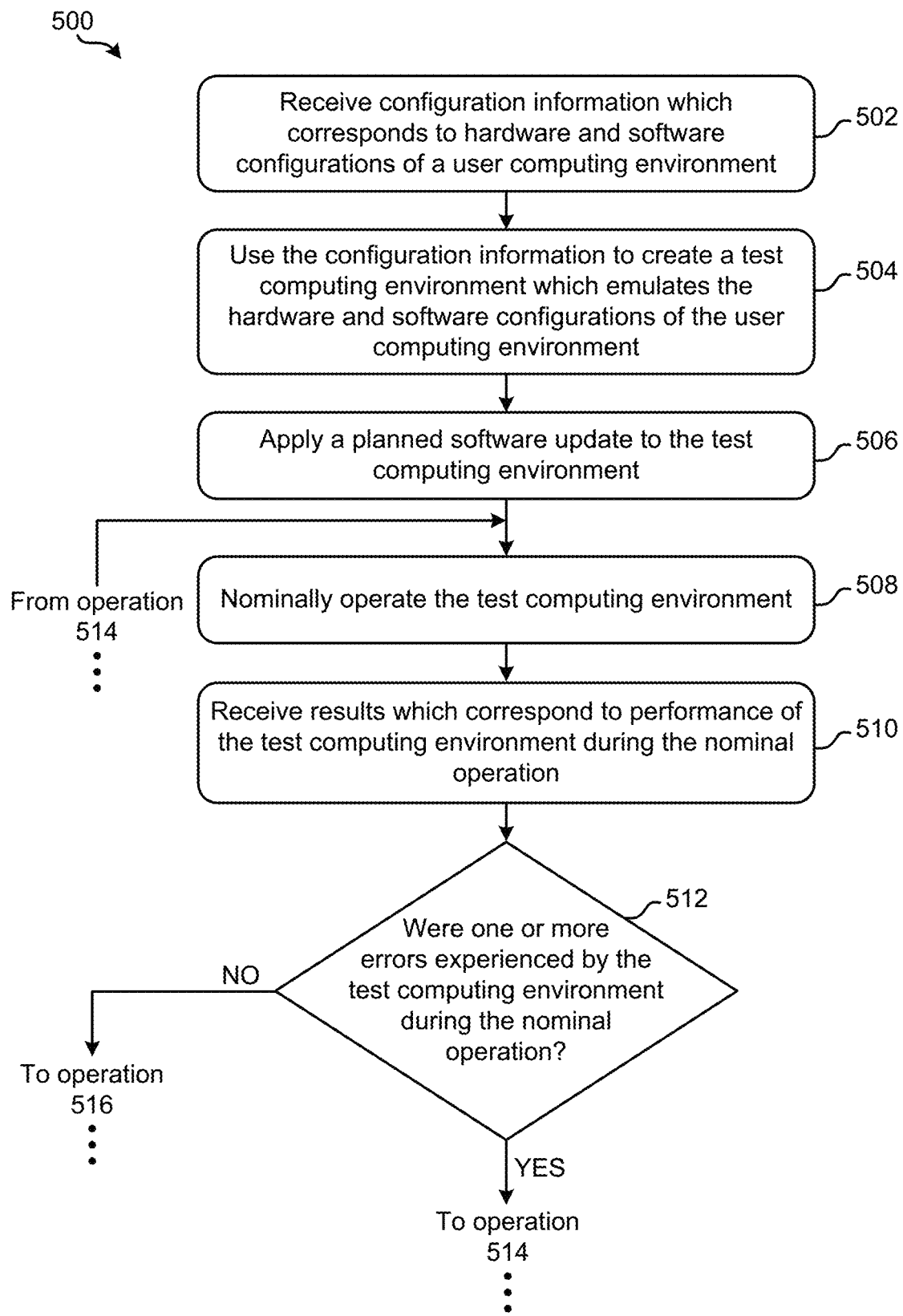
FIG. 5A is a flowchart of a method in accordance with one embodiment.
Figure 5A:
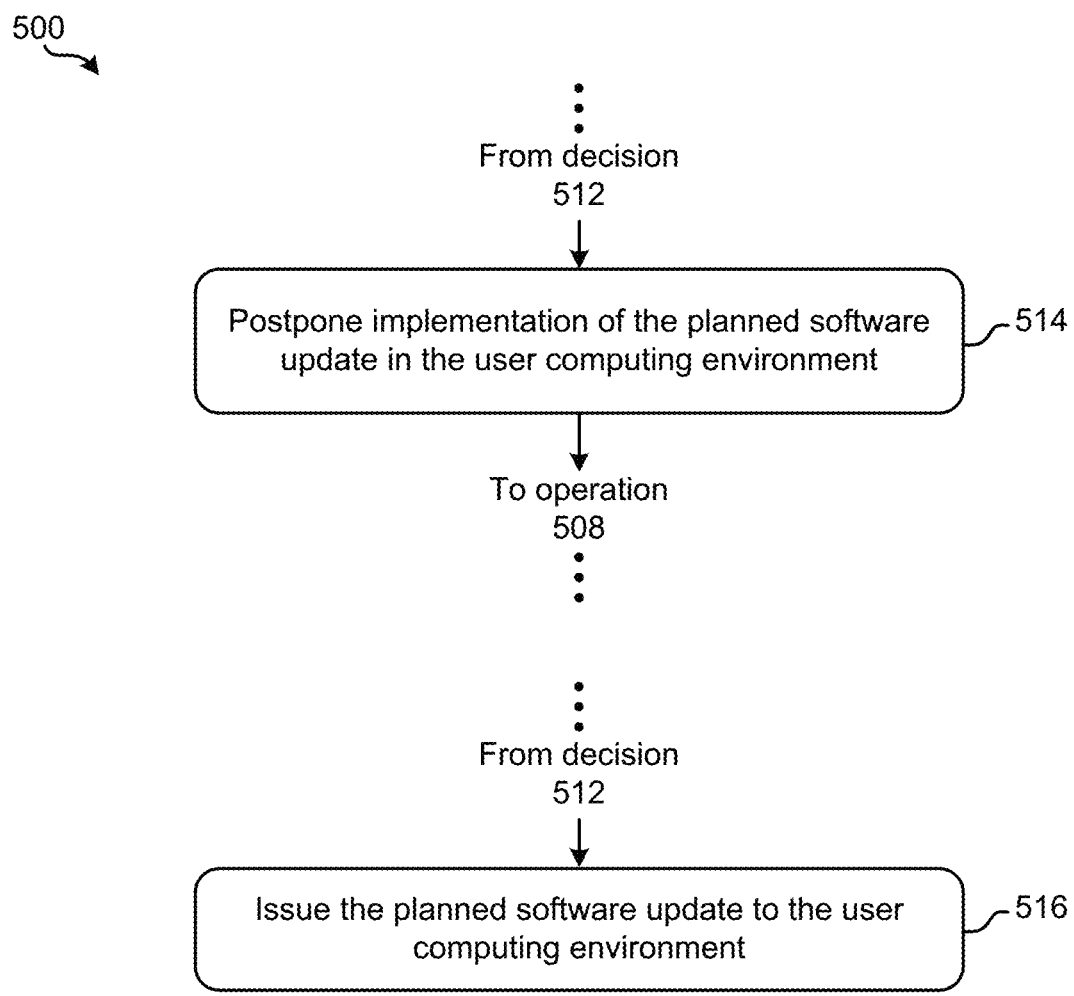

Looking now to FIG. 5A, a flowchart of a method 500 for testing a software update on an emulated computing environment is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller (e.g., see 416 of FIG. 4 above), a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes receiving configuration information which corresponds to hardware and software configurations of a user computing environment. With respect to the present description, a "user computing environment" refers to a customer environment in some approaches, which may include any number of hosts, processors, network switches, operating system software, etc. As mentioned above, in some approaches configuration information is received automatically over time in the form of "call-home" or other diagnostic data from the user computing environment. In other approaches, one or more requests for specific types of information may also be sent to a user computing environment. The information that is received from the user computing environment over time thereby provides a detailed view as to how the user computing environment is configured physically (e.g., hardware) and/or logically (e.g., software).

This configuration information may further be used to selectively configure a test computing environment (e.g., see software provider environment 402 of FIG. 4) such that it emulates the hardware and software configurations of the user computing environment. Accordingly, operation 504 includes using the configuration information to create a test computing environment which emulates the hardware and software configurations of the user computing environment. The more accurately the test computing environment emulates the configurations of the user computing environment, the more reliably the test computing environment is able to predict how the user computing environment will react to the software update. The test computing environment thereby preferably emulates the user computing environment in as much detail as possible.

However, for configuration settings that are unknown for the user computing environment, the test computing environment may simply apply default values that are predetermined by an administrator, based on industry standards, computed based on known configuration settings, etc. According to an example, configuration settings may include any of those that are configurable using methods which would be apparent to one skilled in the art after reading the present description, e.g., such as using a command-line interface (CLI), a graphical user interface (GUI), a simple network management protocol (SNMP), scripts and/or patches applied to the system, etc. It follows that the test computing environment is able to accurately predict failure conditions and provide information that assists in determining a best course of action, e.g., such as performing configuration changes, training, identification of previously unknown software bugs, etc. Any of the approaches included herein may also be integrated with additional precheck procedures and/or health checks that are performed prior to issuing a software update, e.g., as would be appreciated by one skilled in the art after reading the present description.

Referring still to FIG. 5A, method 500 includes applying a planned software update to the test computing environment. See operation 506. The planned software update may be applied to the test computing environment differently depending on the type of software update. For instance, in some approaches the planned software update may be integrated into an existing software that is implemented by the test computing environment, and therefore implemented by the user computing environment as well. In other approaches, implementing the planned software update may involve reprogramming and restarting the test computing environment.

Operation 508 further includes nominally operating the test computing environment with the planned software update applied thereto. In other words, after the planned software update has been applied to the test computing environment, the test computing environment is allowed to operate as the user computing environment is expected to. This may be achieved by simply initiating the software, running a specific operation, issuing a particular command, etc., e.g., depending on the planned software update that has been applied to the test computing environment. The test computing environment may be nominally operated for any desired amount of time, e.g., several days, prior to actually implementing the planned software update in a user computing environment.

Moreover, operation 510 includes receiving results which correspond to performance of the test computing environment during the nominal operation. In some approaches the results are received or at least monitored automatically, while in other approaches results are requested and received as desired. The results may be stored in memory for future use, analyzed in real time, copied and sent to the user computing environment, etc. It follows that in some approaches the received results which correspond to performance of the test computing environment during the nominal operation, are sent to the user computing environment. Accordingly, the results may be integrated with existing health checks that are performed at the user computing environment prior to the update being applied, e.g., as would be appreciated by one skilled in the art after reading the present description.

Decision 512 includes determining whether one or more errors were experienced by the test computing environment during the nominal operation. This determination is made in preferred approaches based, at least in part, on the results received in operation 510. Decision 512 is preferably able to determine whether an error of any type was experienced by the test computing environment during the nominal operation. In other words, decision 512 is preferably able to detect any type of error. However, in some approaches the test computing environment is focused on identifying certain types of errors while other types of errors may be ignored. According to an example which is in no way intended to limit the invention, the test computing environment may implement an update to an overarching data management program. Accordingly, decision 512 may be concerned with determining whether any session timeouts are experienced by the data management program (e.g., as a result of the program crashing) while read errors experienced by the physical memory components may be ignored as they do not directly pertain to the software update implemented by the test computing environment. In still other approaches, decision 512 may implement a tolerance which identifies a certain number, type, combination, etc., of errors.

In response to determining that at least one error was experienced by the test computing environment during the nominal operation, method 500 proceeds to operation 514. There, operation 514 includes postponing implementation of the planned software update in the user computing environment. In other words, because the test computing environment emulates the hardware and software configurations of the user computing environment, the fact that the test computing environment experienced one or more errors as a result of implementing the planned software update may be used to deduce that the user computing environment would experience the same or similar errors.

In addition to postponing implementation of the planned software update, operation 514 also preferably involves remedying the cause of the one or more errors which were experienced by the test computing environment. Once the cause(s) of the errors are remedied, the planned software update may be retested in some approaches to determine the effect that the changes made to the software update had on it. However, in some approaches the planned software update may simply be issued to users after the one or more errors have been remedied.

Figure 5B:
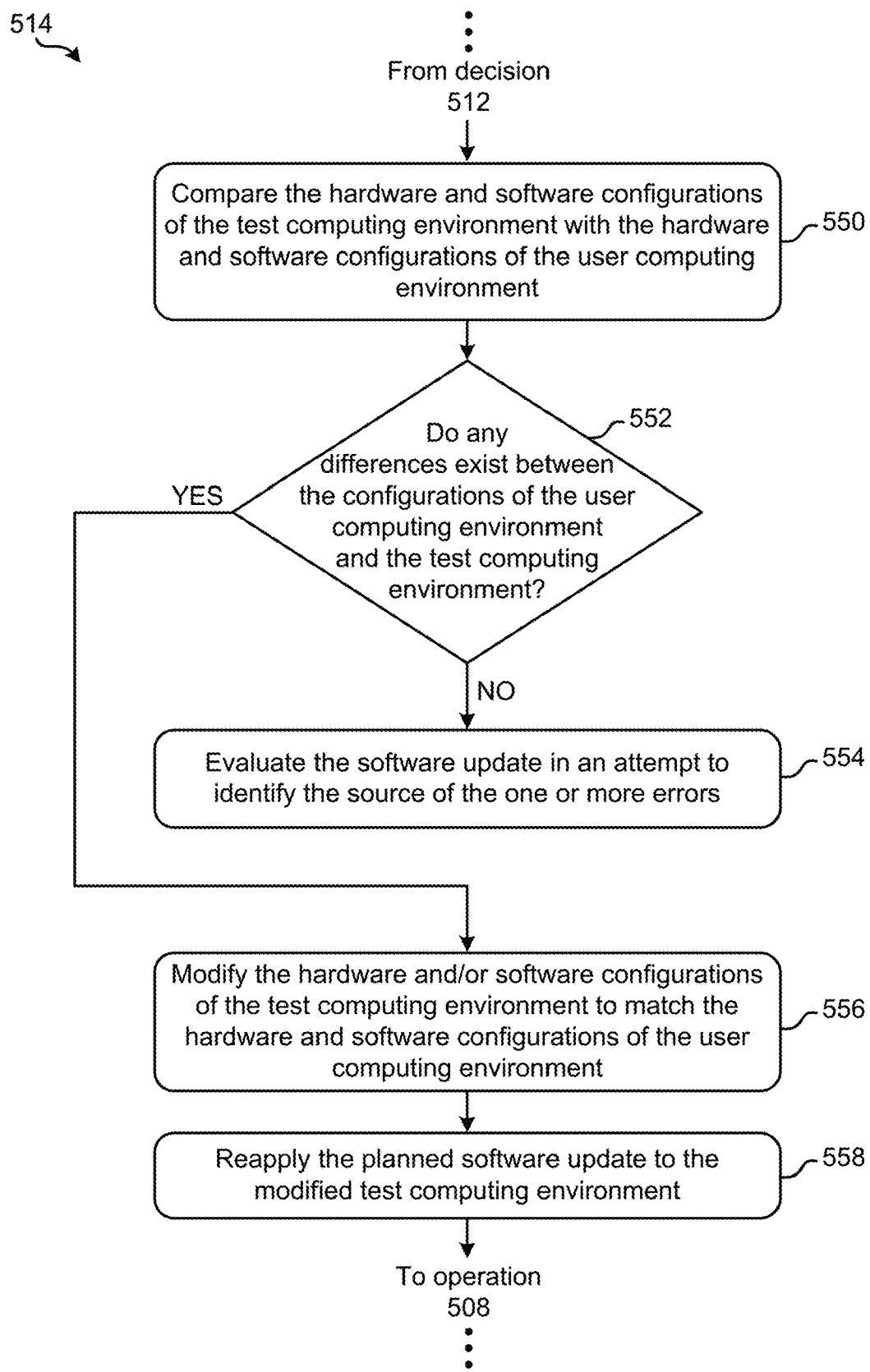
FIG. 5B is a flowchart of sub-processes for one of the operations in the method of FIG. 5A, in accordance with one embodiment.
Figure 5C:
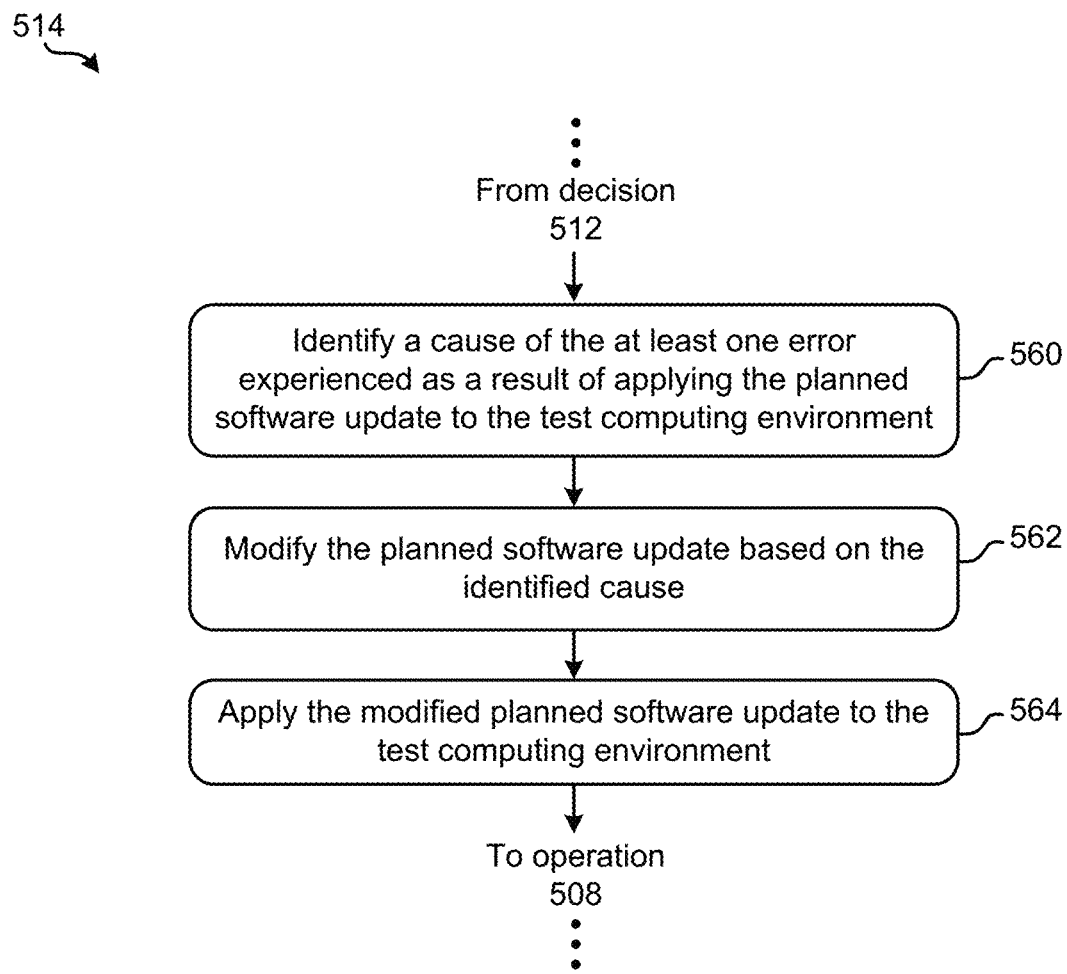
FIG. 5C is a flowchart of sub-processes for one of the operations in the method of FIG. 5A, in accordance with one embodiment.

Looking now to FIG. 5B, exemplary sub-processes of postponing implementation of the planned software update in the user computing environment and remedying the cause of the one or more errors which were experienced are illustrated in accordance with one embodiment. Any one or more of these sub-processes may be used to perform operation 514 of FIG. 5A. However, it should be noted that the sub-processes of FIG. 5B are illustrated in accordance with one embodiment which is in no way intended to limit the invention. For example, FIG. 5C illustrates exemplary sub-processes in accordance with another embodiment, e.g., as will be described in further detail below.

As shown in FIG. 5B, sub-operation 550 includes comparing the hardware and software configurations of the test computing environment with the hardware and software configurations of the user computing environment. As mentioned above, the test computing environment preferably emulates both the hardware and software configurations of the user computing environment. Accordingly, errors that are experienced by the test computing environment as a result of applying the planned software update may have been caused by inaccuracies in the process of forming the test computing environment.

Decision 552 further includes determining whether any differences exist between the hardware and software configurations of the test computing environment, and the hardware and software configurations of the user computing environment. In response to determining that at least one difference exists between the configurations of the test computing environment and the configurations of the user computing environment, the flowchart proceeds to sub-operation 554. There, sub-operation 554 includes evaluating the software update in an attempt to identify the source of the one or more errors which were experienced. The software update may be evaluated using any of the approaches described below with respect to FIG. 5B, or any other procedures which would be apparent to one skilled in the art after reading the present description.

However, in response to determining that at least one difference exists between the configurations of the test computing environment and the configurations of the user computing environment, the flowchart proceeds to sub-operation 556. There, sub-operation 556 includes modifying the hardware and/or software configurations of the test computing environment to match the hardware and software configurations of the user computing environment. The modifications that are made to the hardware and/or software configurations of the test computing environment vary depending on the differences that exist between the test and user computing environments. For instance, in some approaches the differences are hardware based and therefore the modifications that are made to the test computing environment may involve making modifications to physical components, e.g., rerouting physical connections, adding and/or subtracting physical components from the environment, etc. Yet, in some approaches the differences between the test and user computing environments may be logical. Accordingly, the modifications that are made to the test computing environment may involve making modifications to logical configurations, e.g., reconfiguring network connections, updating operating software, redownloading drivers, etc. In still other approaches, the differences between the test and user computing environments may be physical and logical whereby any of the foregoing approaches may be applied.

Proceeding to sub-operation 558, the planned software update is reapplied to the modified test computing environment, before returning to operation 508 of FIG. 5A such that the modified test computing environment is able to operate nominally. It follows that the sub-operations included in FIG. 5B may be repeated any number of times depending on how the modifications made to the test computing environment ultimately effect performance of the planned software update. However, in some approaches a limit may be set for the number of times that the sub-processes in FIG. 5B may be repeated.

As alluded to above, FIG. 5C also depicts exemplary sub-processes of postponing implementation of the planned software update in the user computing environment and remedying the cause of the one or more errors which were experienced in accordance with one embodiment. Any one or more of these sub-processes may be used to perform operation 514 of FIG. 5A. However, it should be noted that the sub-processes of FIG. 5C are illustrated in accordance with one embodiment which is in no way intended to limit the invention.

Sub-operation 560 includes identifying a cause of the at least one error experienced as a result of applying the planned software update to the test computing environment. As previously mentioned, the test computing environment preferably emulates both the hardware and software configurations of the user computing environment. Thus, any errors that are experienced as a result of applying the planned software update to the test computing environment may actually be caused by the planned software update itself (e.g., unidentified bugs in the software). Any software evaluation procedures which would be apparent to one skilled in the art after reading the present description may be implemented in order to identify a cause of the at least one experienced error.

Moreover, in response to identifying one or more causes of the error(s) experienced, sub-operation 562 includes modifying the planned software update based on the identified cause. As mentioned above, the modifications that are made ultimately depend on the determined cause of the error(s), but may include amending (e.g., deleting, adding to, modifying existing, etc.) software code, adjusting how the software code is integrated into a computing environment, etc.

Proceeding to sub-operation 564, the now modified planned software update is applied to the test computing environment before returning to operation 508 of FIG. 5A such that the test computing environment is able to operate nominally. It follows that the sub-operations included in FIG. 5C may be repeated any number of times depending on how the modifications made to the planned software update ultimately effect performance in the test computing environment. However, in some approaches a limit may be set for the number of times that the sub-processes in FIG. 5C may be repeated.

Returning now to decision 512 in FIG. 5A, method 500 proceeds to operation 516 in response to determining no errors were experienced by the test computing environment during the nominal operation. There, operation 516 includes actually issuing (e.g., sending and executing) the planned software update to the user computing environment.

It follows that various ones of the embodiments included herein are able to apply a planned software update to a testing environment which emulates both the physical (e.g., hardware) and logical (e.g., software) configurations of the user computing environments that the software update is planned to be applied to. In doing so, the planned software update can be implemented as it is intended to be in the user (e.g., customer) computing environment. In other words, the embodiments herein are able to identify any issues that would arise as a result of actually implementing the software update in the user computing environment and adjust the software update such that the issues are avoided when the software update is actually issued.

Figure 6:
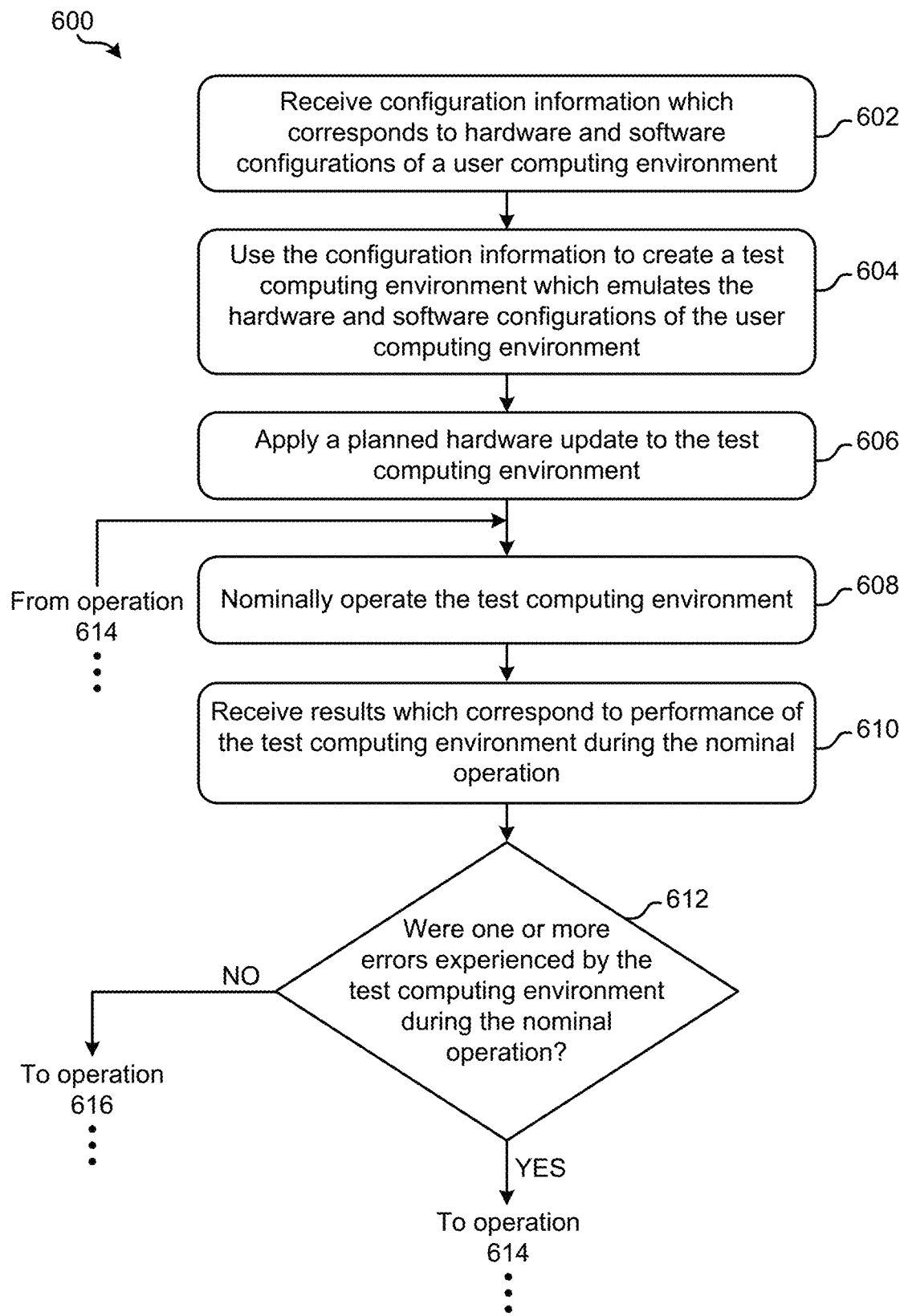
FIG. 6 is a flowchart of a method in accordance with one embodiment.
Figure 6:
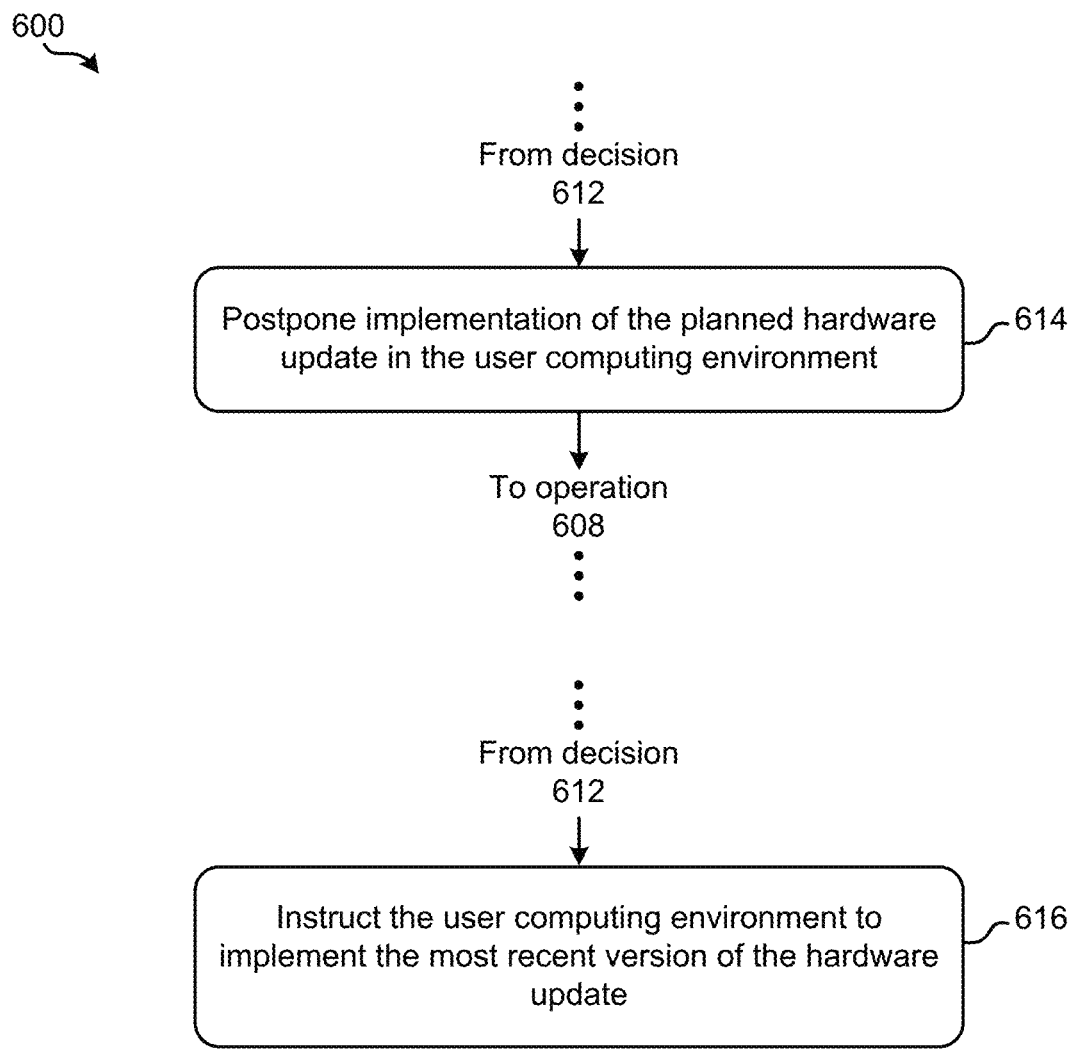

It should also be noted that while various ones of the approaches included herein have been described in the context of performing software updates, any of these approaches may be applied to testing planned hardware based updates as well. For example, FIG. 6 illustrates a flowchart of a method 600 for testing a hardware update on an emulated computing environment is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller (e.g., see 416 of FIG. 4 above), a processor, a computer, etc., or some other device having one or more processors therein. Thus, in some embodiments, method 600 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 of method 600 includes receiving configuration information which corresponds to hardware and software configurations of a user computing environment. As noted above, a "user computing environment" refers to a customer environment in some approaches, which may include any number of hosts, processors, network switches, operating system software, etc. As mentioned above, in some approaches configuration information is received automatically over time in the form of "call-home" or other diagnostic data from the user computing environment. In other approaches, one or more requests for specific types of information may also be sent to a user computing environment. The information that is received from the user computing environment over time thereby provides a detailed view as to how the user computing environment is configured physically (e.g., hardware) and/or logically (e.g., software).

This configuration information may further be used to selectively configure a test computing environment (e.g., see software provider environment 402 of FIG. 4) such that it emulates the hardware and software configurations of the user computing environment. Accordingly, operation 604 includes using the configuration information to create a test computing environment which emulates the hardware and software configurations of the user computing environment. The more accurately the test computing environment emulates the configurations of the user computing environment, the more reliably the test computing environment is able to predict how the user computing environment will react to the hardware update. The test computing environment thereby preferably emulates the user computing environment in as much detail as possible.

However, for configuration settings that are unknown for the user computing environment, the test computing environment may simply apply default values that are predetermined by an administrator, based on industry standards, computed based on known configuration settings, etc., e.g., as described above with respect to FIG. 5A.

Referring still to FIG. 6, method 600 includes applying a planned hardware update to the test computing environment. See operation 606. The planned hardware update may be applied to the test computing environment differently depending on the type of hardware update. For instance, in some approaches the planned hardware update may be integrated into an existing hardware configuration that is implemented by the test computing environment, and therefore implemented by the user computing environment as well. In other approaches, implementing the planned hardware update may involve reconfiguring the test computing environment. According to an exemplary approach which is in no way intended to limit the invention, the planned hardware update may involve a manufacturing equipment specification (MES) upgrade. According to another exemplary approach which is in no way intended to limit the invention, the planned hardware update may involve upgrading and/or supplementing CPUs, hard drives, network switches, memory modules, etc., in the user computing environment.

Operation 608 further includes nominally operating the test computing environment with the planned hardware update applied thereto. In other words, after the planned hardware update has been applied to the test computing environment, the test computing environment is allowed to operate as the user computing environment is expected to, e.g., using existing software. This may be achieved by simply initiating the existing software, running a specific operation that pertains to the hardware update, issuing a particular command, etc., e.g., depending on the planned hardware update that has been applied to the test computing environment. The test computing environment may be nominally operated for any desired amount of time, e.g., several days, prior to actually implementing the planned hardware update in a user computing environment.

Moreover, operation 610 includes receiving results which correspond to performance of the test computing environment during the nominal operation. In some approaches the results are received or at least monitored automatically, while in other approaches results are requested and received as desired. The results may be stored in memory for future use, analyzed in real time, copied and sent to the user computing environment, etc. It follows that in some approaches the received results which correspond to performance of the test computing environment during the nominal operation, are sent to the user computing environment. Accordingly, the results may be integrated with existing health checks that are performed at the user computing environment prior to the hardware update being applied, e.g., as would be appreciated by one skilled in the art after reading the present description.

Decision 612 includes determining whether one or more errors were experienced by the test computing environment during the nominal operation. This determination is made in preferred approaches based, at least in part, on the results received in operation 610. Decision 612 is preferably able to determine whether an error of any type was experienced by the test computing environment during the nominal operation. In other words, decision 612 is preferably able to detect any type of error. However, in some approaches the test computing environment is focused on identifying certain types of errors while other types of errors may be ignored. In still other approaches, decision 612 may implement a tolerance which identifies a certain number, type, combination, etc., of errors.

In response to determining that at least one error was experienced by the test computing environment during the nominal operation, method 600 proceeds to operation 614. There, operation 614 includes postponing implementation of the planned hardware update in the user computing environment. In other words, because the test computing environment emulates the hardware and software configurations of the user computing environment, the fact that the test computing environment experienced one or more errors as a result of implementing the planned hardware update may be used to deduce that the user computing environment would experience the same or similar errors. Operation 614 preferably also includes remedying the error(s) experienced by the test computing environment. Any one or more of the approaches that are described herein may be implemented in an attempt to remedy the error(s).

Once an attempt has been made to remedy the error(s), the test computing environment is operated nominally again in order to determine whether these attempts were successful. It follows that processes 608, 610, 612, 614 may be repeated a number of times, e.g., preferably until it is determined that no errors were experienced by the test computing environment during the nominal operation. As shown, method 600 proceeds to operation 616 from decision 612 in response to determining that no errors were experienced, where operation 616 includes notifying (e.g., instructing) the user computing environment to implement the most recent version of the hardware update.

Again, various ones of the embodiments included herein are able to use known information of user computing environment configurations to emulate, e.g., actually run, planned software and/or hardware updates on a real testing system. The hardware and software configurations implemented at the user computing environment may be determined using information received therefrom (e.g., "call-home" data), using collected configuration settings which augment information on the hardware and software configurations, etc. It follows that the test computing environment is able to emulate settings, types of optional hardware, enhanced features, network information on hosts and/or switches, IOPs, a number of connected hosts during the update, etc. These hardware and/or software update trials may be performed manually in some approaches, but in others approaches the process may be automated, e.g., using any processes which would be apparent to one skilled in the art after reading the present description. Results of the emulation test can also be uploaded to the user computing environment itself and/or other locations, e.g., such as that of a team charged with implementing the hardware and/or software update(s) successfully.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving configuration information which corresponds to hardware and software configurations of a user computing environment;
using the configuration information to create a test computing environment which emulates the hardware and software configurations of the user computing environment;
applying a software update to the test computing environment;
operating the test computing environment with the software update applied thereto;
receiving results which correspond to performance of the test computing environment during the operation;
determining whether one or more errors were experienced by the test computing environment during the operation; and
in response to determining that at least one error was experienced by the test computing environment during the operation, postponing implementation of the software update in the user computing environment,
wherein postponing implementation of the software update in the user computing environment includes:

determining whether any differences exist between: the hardware and software configurations of the test computing environment and the hardware and software configurations of the user computing environment, in response to determining that at least one difference exists between the configurations of the test computing environment and the configurations of the user computing environment, modifying the hardware and/or software configurations of the test computing environment to match the hardware and software configurations of the user computing environment, wherein modifying the hardware configurations of the test computing environment includes adding and/or subtracting physical components from the test computing environment, applying the software update to the modified test computing environment, and operating the modified test computing environment in response to applying the software update thereto.

2. The computer-implemented method of claim 1, wherein postponing implementation of the software update in the user computing environment includes:

identifying a cause of the at least one error;

modifying the software update based on the identified cause of the at least one error;

applying the modified software update to the test computing environment; and operating the test computing environment in response to applying the modified software update thereto.

3. The computer-implemented method of claim 1, wherein the test computing environment emulates hardware and/or software configurations of the user computing environment selected from the group consisting of: a number of input/output operations per second (IOPs) performed by the user computing environment, a number of hosts that are connected to the user computing environment, a number of logical unit numbers (LUNs) included at the user computing environment, and types of network switches that are connected to the user computing environment.

4. The computer-implemented method of claim 1, wherein the test computing environment emulates a number of IOPs performed by the user computing environment, and a number of hosts that are connected to the user computing environment.

5. The computer-implemented method of claim 1, comprising:

in response to determining no errors were experienced by the test computing environment during the operation, issuing the software update to the user computing environment.

6. The computer-implemented method of claim 1, comprising:

sending the results which correspond to performance of the test computing environment during the operation to the user computing environment.

7. A computer program product comprising a computer readable storage medium having program instructions embodied therewith, the program instructions readable and/or executable by a processor to cause the processor to:

receive, by the processor, configuration information which corresponds to hardware and software configurations of a user computing environment;

use, by the processor, the configuration information to create a test computing environment which emulates the hardware and software configurations of the user computing environment;

apply, by the processor, a software update to the test computing environment;

operate, by the processor, the test computing environment with the software update applied thereto;

receive, by the processor, results which correspond to performance of the test computing environment during the operation;

determine, by the processor, whether one or more errors were experienced by the test computing environment during the operation; and in response to determining that at least one error was experienced by the test computing environment during the operation, postpone, by the processor, implementation of the software update in the user computing environment, wherein postponing implementation of the software update in the user computing environment includes:

determining whether any differences exist between: the hardware and software configurations of the test computing environment and the hardware and software configurations of the user computing environment, in response to determining that at least one difference exists between the configurations of the test computing environment and the configurations of the user computing environment, modifying the hardware and/or software configurations of the test computing environment to match the hardware and software configurations of the user computing environment, wherein modifying the hardware configurations of the test computing environment includes rerouting physical connections in the test computing environment, applying the software update to the modified test computing environment, and operating the modified test computing environment in response to applying the software update thereto.

8. The computer program product of claim 7, wherein postponing implementation of the software update in the user computing environment includes:

identifying a cause of the at least one error;

modifying the software update based on the identified cause of the at least one error;

applying the modified software update to the test computing environment; and operating the test computing environment in response to applying the modified software update thereto.

9. The computer program product of claim 7, wherein the test computing environment emulates hardware and/or software configurations of the user computing environment selected from the group consisting of: a number of input/output operations per second (IOPs) performed by the user computing environment, a number of hosts that are connected to the user computing environment, a number of logical unit numbers (LUNs) included at the user computing environment, and types of network switches that are connected to the user computing environment.

10. The computer program product of claim 7, wherein the test computing environment emulates a number of IOPs performed by the user computing environment, and a number of hosts that are connected to the user computing environment.

11. The computer program product of claim 7, wherein the program instructions are readable and/or executable by the processor to cause the processor to:

in response to determining no errors were experienced by the test computing environment during the operation, issue, by the processor, the software update to the user computing environment.

12. The computer program product of claim 7, wherein the program instructions are readable and/or executable by the processor to cause the processor to:
send, by the processor, the results which correspond to performance of the test computing environment during the operation to the user computing environment.

13. A system, comprising:
a processor; and
logic integrated with the processor, executable by the processor, or integrated with and executable by the processor, the logic being configured to:
receive, by the processor, configuration information which corresponds to hardware and software configurations of a user computing environment;
use, by the processor, the configuration information to create a test computing environment which emulates the hardware and software configurations of the user computing environment;
apply, by the processor, a software update to the test computing environment;
operate, by the processor, the test computing environment with the software update applied thereto;
receive, by the processor, results which correspond to performance of the test computing environment during the operation;
determine, by the processor, whether one or more errors were experienced by the test computing environment during the operation; and
in response to determining that at least one error was experienced by the test computing environment during the operation, postpone, by the processor, implementation of the software update in the user computing environment,
wherein postponing implementation of the software update in the user computing environment includes:
determining whether any differences exist between: the hardware and software configurations of the test computing environment, and the hardware and software configurations of the user computing environment;
in response to determining that at least one difference exists between the configurations of the test computing environment and the configurations of the user computing environment, modifying the hardware and/or software configurations of the test computing environment to match the hardware and software configurations of the user computing environment;
applying the software update to the modified test computing environment; and
operating the modified test computing environment in response to applying the software update thereto.

14. The system of claim 13, wherein postponing implementation of the software update in the user computing environment includes:
identifying a cause of the at least one error;
modifying the software update based on the identified cause of the at least one error;
applying the modified software update to the test computing environment; and
operating the test computing environment in response to applying the modified software update thereto.

15. The system of claim 13, wherein the test computing environment emulates a number of input/output operations per second (IOPs) performed by the user computing environment, a number of hosts that are connected to the user computing environment, a number of logical unit numbers (LUNs) included at the user computing environment, and types of network switches that are connected to the user computing environment.

16. The system of claim 13, the logic being configured to:
in response to determining no errors were experienced by the test computing environment during the operation, issue, by the processor, the software update to the user computing environment.

17. The system of claim 13, the logic being configured to:
send, by the processor, the results which correspond to performance of the test computing environment during the operation to the user computing environment,
wherein modifying the hardware configurations of the test computing environment includes an action selected from the group consisting of: rerouting physical connections in the test computing environment, and adding and/or subtracting physical components from the test computing environment,
wherein modifying the software configurations of the test computing environment includes an action selected from the group consisting of: reconfiguring network connections, updating operating software, and redownloading drivers.

* * * * *